(12) United States Patent
Ranganathan

(10) Patent No.: US 9,723,431 B2
(45) Date of Patent: Aug. 1, 2017

(54) CLOSE PROXIMITY TRANSPORT CONFIGURATION

(71) Applicant: Intel Corporation, Santa Clara, CA (US)

(72) Inventor: Sridharan Ranganathan, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/576,170

(22) Filed: Dec. 18, 2014

(65) Prior Publication Data

US 2016/0183031 A1    Jun. 23, 2016

(51) Int. Cl.
| | |
|---|---|
| *H04B 5/00* | (2006.01) |
| *H04W 4/00* | (2009.01) |
| *G06F 13/42* | (2006.01) |
| *H04L 29/06* | (2006.01) |

(52) U.S. Cl.
CPC ........ *H04W 4/008* (2013.01); *G06F 13/4282* (2013.01); *H04L 69/24* (2013.01); *H04L 69/18* (2013.01)

(58) Field of Classification Search
CPC .......... H04W 4/008; H04B 5/00; H04L 69/18; H04L 69/24
USPC ........................................................ 455/41.1
See application file for complete search history.

(56) References Cited

U.S. PATENT DOCUMENTS

| | | | | |
|---|---|---|---|---|
| 8,823,494 | B1* | 9/2014 | Kovitz ................. | H01Q 1/2225 340/10.1 |
| 2010/0267334 | A1* | 10/2010 | Hashimoto ......... | H04M 1/7253 455/41.2 |
| 2011/0145427 | A1* | 6/2011 | Amento .............. | H04L 65/1016 709/231 |
| 2012/0309303 | A1* | 12/2012 | Hillan .................. | H04B 5/0031 455/41.1 |
| 2013/0295849 | A1* | 11/2013 | Carlton ................... | H04W 4/02 455/41.2 |

FOREIGN PATENT DOCUMENTS

| | | |
|---|---|---|
| EP | 1845632 | 8/2014 |
| JP | 2010157977 | 7/2010 |

(Continued)

OTHER PUBLICATIONS

European Extended Search Report in European Patent Application No. EP15194179.6 mailed Apr. 16, 2013.

(Continued)

*Primary Examiner* — Ayodeji Ayotunde
(74) *Attorney, Agent, or Firm* — Patent Capital Group

(57) ABSTRACT

A close proximity wireless connection is initiated between a first device and a second device, and a channel configuration module sends first data over the wireless connection to advertise one or more supported channel configurations of the first device to the second device, and receives second data over the wireless connection. The second data is to advertise one or more supported channel configurations of the second device to the first device. A particular one of a plurality of modes of the first device is determined to be used in communications with the second device over the close proximity wireless connection based on the first and second data.

19 Claims, 8 Drawing Sheets

(56) References Cited

FOREIGN PATENT DOCUMENTS

| | | |
|---|---|---|
| JP | 2011090396 | 5/2011 |
| JP | 2013156915 | 1/2012 |

OTHER PUBLICATIONS

Japanese First Office Action mailed Oct. 4, 2016 in Japanese Patent Application No. 2015-224765 (8 pgs).
Notice of Preliminary Rejection in Korean Appliation No. 10-2015-0160361 mailed Nov. 3, 2016.

* cited by examiner

CLOSE PROXIMITY TRANSPORT CONFIGURATION

FIELD

The present disclosure relates in general to the field of computer communications, and more specifically, to close proximity wireless communications.

BACKGROUND

Computing devices are becoming increasingly smaller in form factor. This coupled with increases in battery life and wireless communications networking have permitted the rapid advancement of computing devices configured for mobility. Such mobile computing devices are increasingly replacing larger, heavier, and more cumbersome desktop computing devices.

A variety of wireless communication solutions exists permitting intercommunication between computing devices. Popular solutions include WiFi, Bluetooth, and Near Field Communication (NFC) technologies. In the case, of NFC, a short-range high frequency wireless communication technology is provided that enables the exchange of data between devices over about a 10 cm distance. The communication protocol and operation is an extension of the ISO 14443 proximity-card standard (contactless card, radio frequency ID (RFID)) and is specified in the ECMA-340 and ISO/IEC 18092 technology standards. NFC is used in some devices to combine the interface of a smartcard and a reader into a single device. An NFC device may communicate with both existing ISO 14443 smartcards and readers, as well as with other NFC devices, and is thereby compatible with existing contactless communication infrastructure. NFC has been used, among other applications, to assist in facilitating electronic payment utilizing smartphones, smart cards, and other electronic devices.

BRIEF DESCRIPTION OF THE DRAWINGS

Like reference numbers and designations in the various drawings indicate like elements.

DETAILED DESCRIPTION

Figure 1:
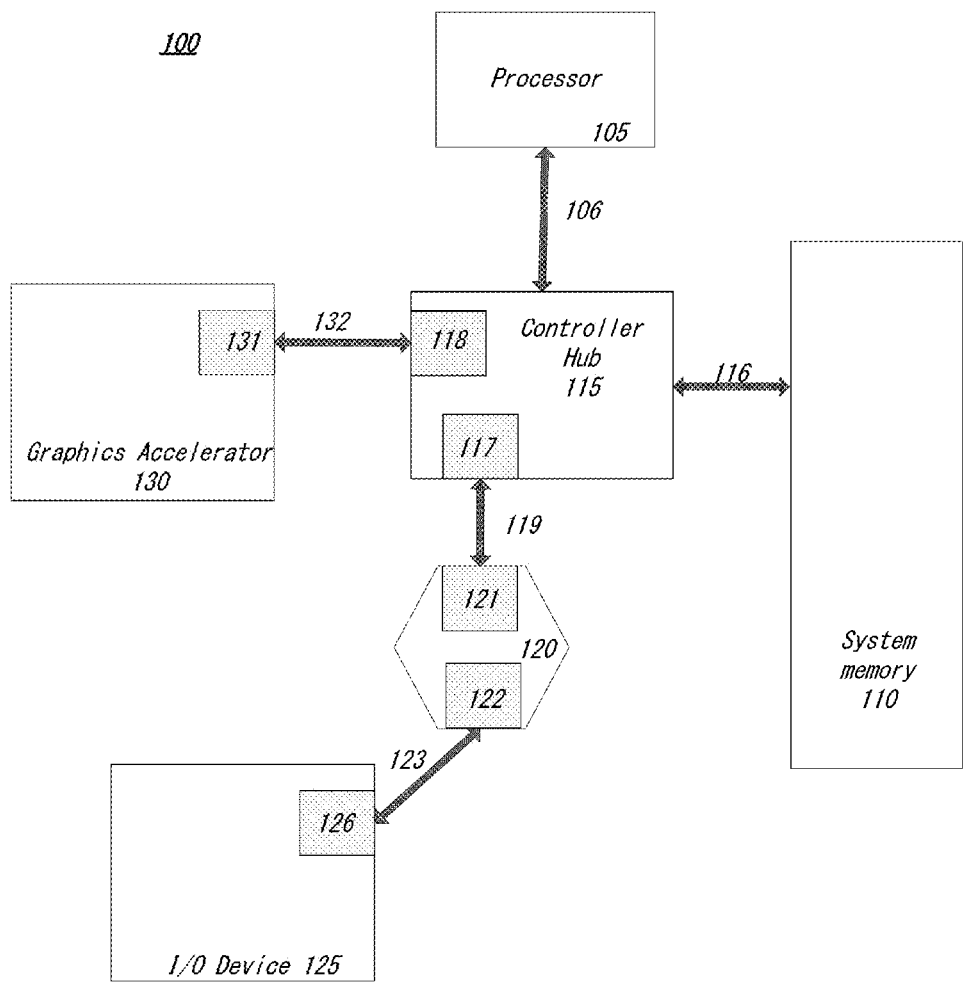
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings, form factor, and usability. A variety of different interconnects can potentially benefit from subject matter described herein.

The Universal Serial Bus (USB) 3.1 architecture, Peripheral Component Interconnect (PCI) Express (PCIe) interconnect architecture, and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. As another example, USB 3.x addresses interconnects connecting hosts with devices, for instance, to extend the functionality of the host through various peripheral devices, such as telephone/fax/modem adapters, answering machines, scanners, PDA's, keyboards, mice, etc. For example, USB can provide a user-friendly plug-and-play way to attach external peripherals to a Personal Computer (PC). USB can be used to facilitate connection between other devices, such as connecting a printer to interface to interface directly with a camera, to connect a mobile device to keyboards, mice, and external displays. Indeed, USB ports are being increasingly embedded in more other appliances, including automobiles, televisions, and set-top boxes. Further, USB's power delivery features have allowed USB ports to also function as a mobile device charging solution, among other solutions. Although the primary discussion herein may at times reference a particular architecture or protocol, it should be appreciated that aspects of the concepts described herein may be applied to other interconnect architectures, such as a PCIe-compliant architecture, a USB-compliant architecture, a QPI-compliant architecture, a MIPI compliant architecture, or other known interconnect architecture.

Referring to FIG. 1, an embodiment of a fabric composed of point-to-point links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in an interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 can route packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Devices can include functionality for initiating and communicating with other devices using a close proximity wireless connection. Devices, in some contexts, can be referred to as an endpoint. Although not specifically shown, a device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
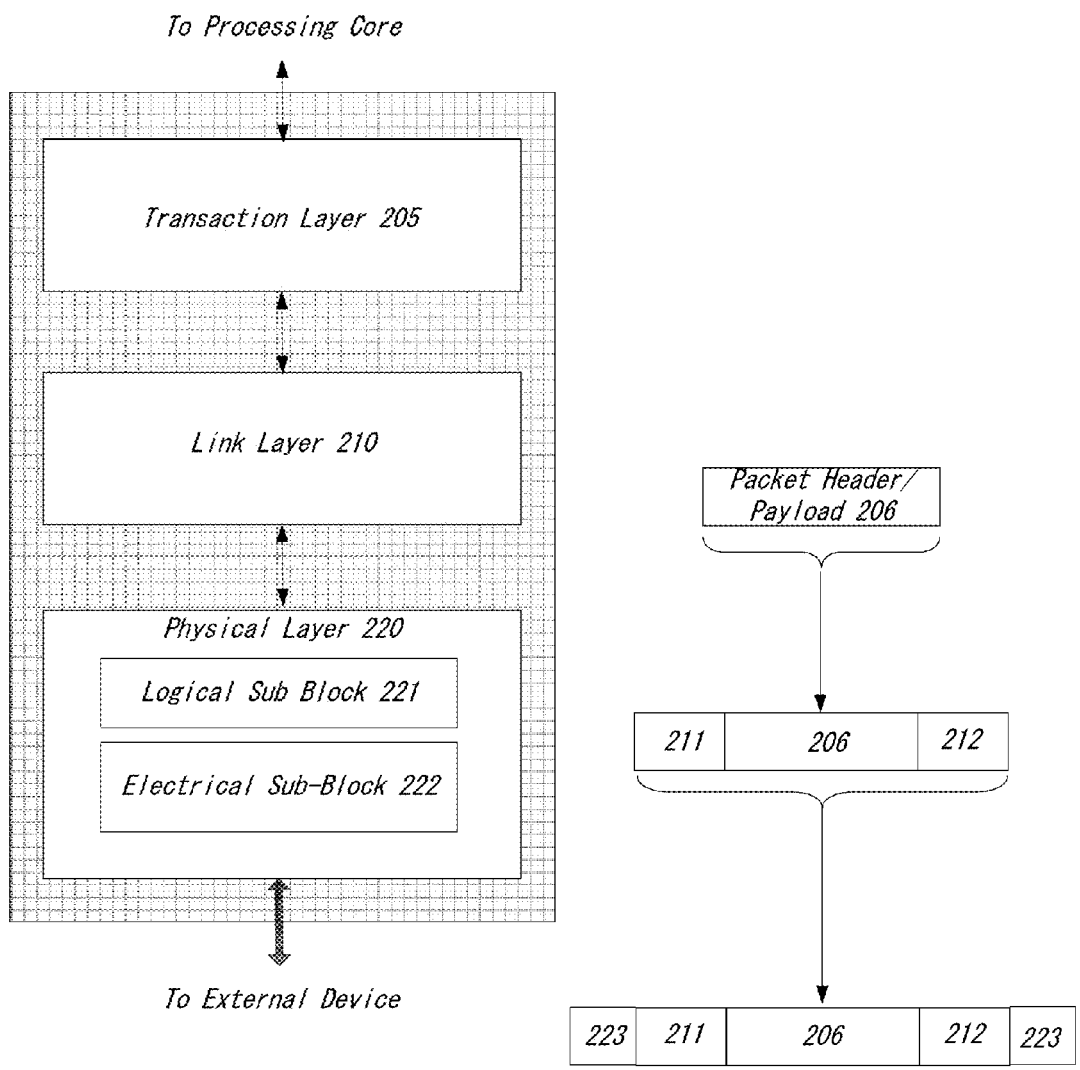
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, USB stack, a next generation high performance computing interconnect (HPI) stack, or other layered stack. In one embodiment, protocol stack 200 can include transaction layer 205, link layer 210, and physical layer 220. One or more interfaces, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and/or Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used in some protocols to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

A Link layer 210, also referred to as data link layer 210, can act as an intermediate stage between transaction layer 205 (or a protocol layer) and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein, as well as other additional or alternative features. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 3:
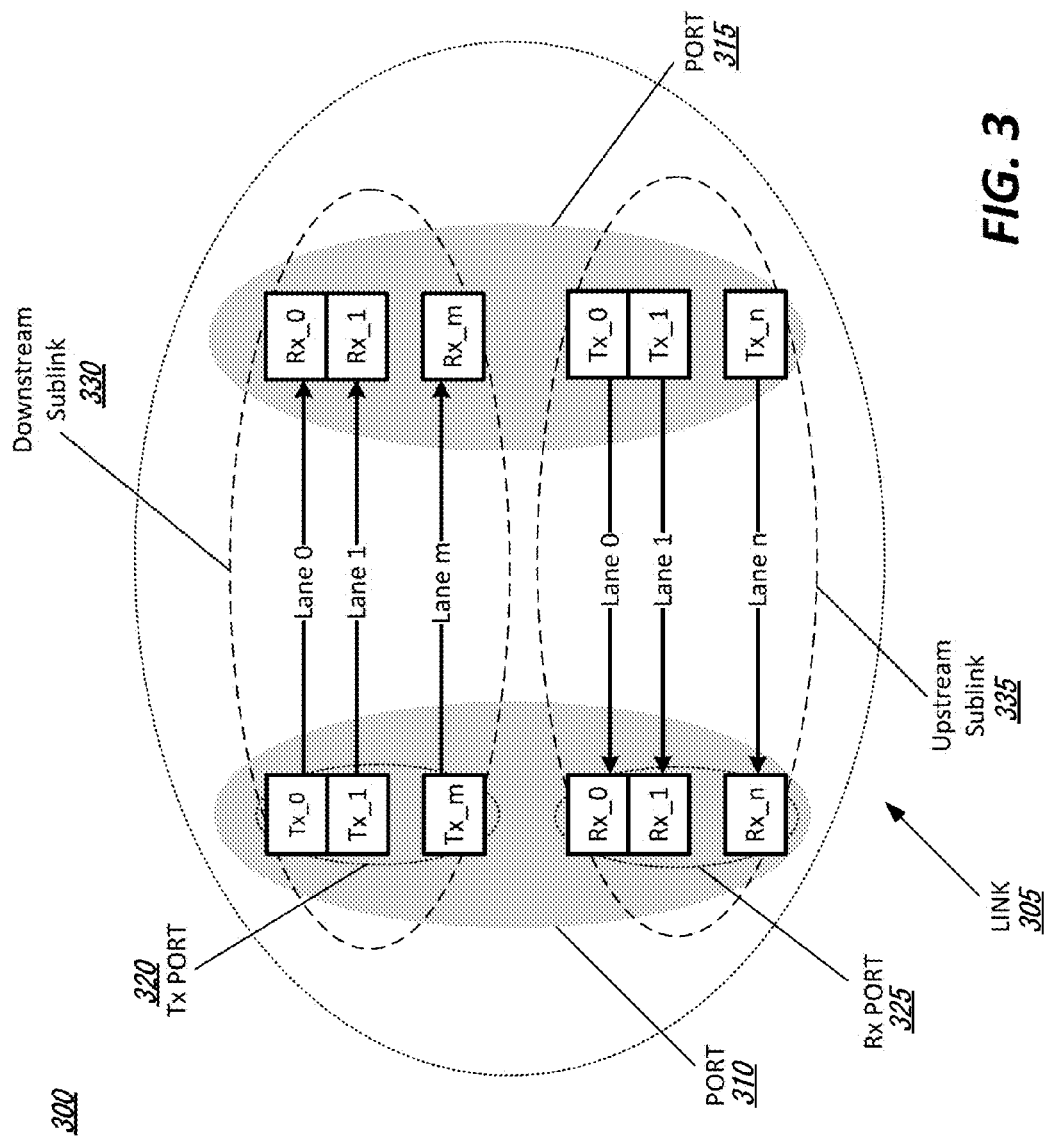
FIG. 3 illustrates an embodiment of a serial point-to-point link connecting two ports.

Referring next to FIG. 3, an example embodiment of a serial point to point fabric is illustrated. A serial point-to-point link 305 can include any transmission path for transmitting serial data. Accordingly, a device can include transmission logic to transmit data to another device and receiving logic to receive data from the other device. In other words, two transmitting paths (e.g., one upstream and one downstream) can be included in some implementations of a link 305.

A transmission path refers to any path for transmitting data, such as a transmission line, a copper line, an optical line, a wireless communication channel, an infrared communication link, or other communication path. A link may support one lane—each lane representing a set of differential signal pairs (one pair for transmission, one pair for reception). To scale bandwidth, a link may aggregate multiple lanes (e.g., denoted by m and n), where the number of lanes represents the potential supported link width of the link 305, such as 1, 2, 4, 8, 12, 16, 32, 64 lanes, or wider).

In the particular example of FIG. 3, a device can include and utilize a port to 310 to facilitate the link 305. The port 310 can communicate data over the link 305 with a port 315 of another endpoint device. In one embodiment, the port 310 can include a transmitter port 320 and a receiver port 325. Further, the transmitter port 320 can be utilized in a downstream sublink 330 to send data to the other device over corresponding lanes (e.g., lanes 0-m). Similarly, a receiver port 325 can receive data from the other device over an upstream sublink 335 (including lanes 0-n).

Some links can utilize a differential pair to realize two transmission paths to transmit differential signals. As an example, when a first line toggles from a low voltage level to a high voltage level, i.e. a rising edge, the other line can drives from a high logic level to a low logic level, i.e. a falling edge. Differential signals can potentially demonstrate better electrical characteristics, such as better signal integrity, i.e. cross-coupling, voltage overshoot/undershoot, ringing, among other example advantages. This allows for a better timing window, which enables faster transmission frequencies, among other potential advantages.

In one embodiment, link training can be provided and include the sending of one or more of training sequences, ordered sets, and control sequences, such as in connection with a defined supersequence to adapt and configure characteristics of the link. In the case of adaptation, electrical characteristics of a lane can be adjusted between a transmitter and receiver based, for instance, on sample data transmitted between the transmitter and receiver. For instance, receiver adaptation can include the transmitter sending a data pattern to the receiver with logic at the receiver adjusting electrical characteristics at the receiver to adapt the lane for the link. Transmitter adaptation can involve the transmitter sending sample data to the receiver and the receiver sending feedback to the transmitter that can be used by the transmitter to make adjustments at the transmitter to adapt the lane. The receiver can continue to send feedback to the transmitter based on the adjustments made at the transmitter. With both the transmitting and receiving devices receiving the same supersequence, each device can further perform additional initialization tasks utilizing the supersequences. For instance, each device can perform debouncing, bit lock, byte lock, descrambling, and deskewing utilizing the supersequences. Additional initialization information can be communicated through the headers and payloads of the TSes included in the supersequences.

In some instances, portions of supersequences can be scrambled (e.g., by XOR-ing the sequence bits with a pseudorandom bit sequence (PRBS), among other examples). In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EIEOS. Supersequences, in one embodiment, can include the insertion of an EOS, such as an EIEOS, in a training sequence stream and the supersequences (and electrical ordered set) can be repeated over short intervals (e.g., approximately one-thousand unit intervals (or ~1KUI)). The training supersequences may be used for one or more of deskew, configuration and for communicating initialization target, lane map, etc. The EIEOS can be used for one or more of transitioning a lane from inactive to active state, screening for good lanes, identifying symbol and TS boundaries, among other examples. Scrambled portions of a sequence can also be used, for instance, to facilitate other configuration tasks such as adaptation, deskew, among other example tasks.

Latency fixing can also be provided in some implementations. Latency can include not only the latency introduced by the transmission media, but also the latency resulting from processing by the agent on the other side the link. Latency of a lane can be determined during initialization of the link. Further, changes in the latency can also be determined. From the determined latency, latency fixing can be initiated to compensate for such changes and return the latency expected for lanes to a constant, expected value. Maintaining consistent latency on a lane can be critical to maintaining determinism in some systems, among other factors.

Communications can be facilitated between devices using close proximity technologies. Close proximity communications can involve devices being brought close together (e.g., on the order of millimeter centimeters or inches) to facilitate a wireless network connection between the devices. In some cases, the devices are to be brought into contact (or in near contact) with each other to facilitate the wireless connection. Close proximity network technologies can include such examples as traditional near field communications (NFC) as well as higher frequency technologies that allow high bandwidth close proximity connections. For instance, in some examples, a near-field communication link can refer to a wireless link between a transmitting and a receiving antenna, where the distance between the respective antennas is roughly less than $2 D^2/lambda$, where D is the largest dimension of the source of the radiation, and lambda is the wavelength, among other examples. In one implementation, extremely high frequency (EHF) signals can be utilized as a carrier using suitable modulation methods to send data over a near-field, or other close proximity, wireless connection while maintaining high bandwidths. For instance, emerging close proximity technologies can serve as the medium for a range of communication protocols from sub-100 Mbps low-speed technologies (e.g., I2C, I2S, GPIO) to multi Gbps high-speed protocols (e.g., USB3, PCIe).

Devices can incorporate close proximity technologies to facilitate inter-device communications without the use of a physical connectors. This feature can permit devices to be developed that do not have any (or have fewer) physical holes in the form factor that can allow more attractive industrial designs that may be sleek, waterproof, or possess other example advantages. High speed close proximity technologies can expand the use of such connections, as they have the potential to support popular high speed protocols, such as PCIe, QPI, High-Definition Multimedia interface (HDMI), Thunderbolt, among other examples. Existing close proximity technologies are limited in their ability to scale and interoperate. For instance, existing close proximity technologies lack a scalable framework for discovering the different protocols and capabilities supported by each link partner, among other example deficiencies. As an example, existing close proximity solutions tend to hard-code the support for a limited subset of functions and use cases. For instance, close proximity communication support may be hardcoded to only support a particular mode and communicate with a particular class of link partners (e.g., the corresponding dock of the device).

Solutions can be provided that include functionality for addressing at least some of the example issues above. For instance, a system can be provided that can facilitate a close proximity wireless connection that allows two devices to communicate configuration and modes and determine a particular protocol, from multiple available protocols, to be used in communications over the close proximity wireless connection. In some examples, portions of an existing protocol (and hardware used to implement the protocols) can be leveraged to assist in facilitating the negotiation of a contract for the communications between the devices over the close proximity wireless communication. Such a protocol can include protocols that aim to establish a universal I/O solution, such as USB Type-C, among other examples.

Figure 4:
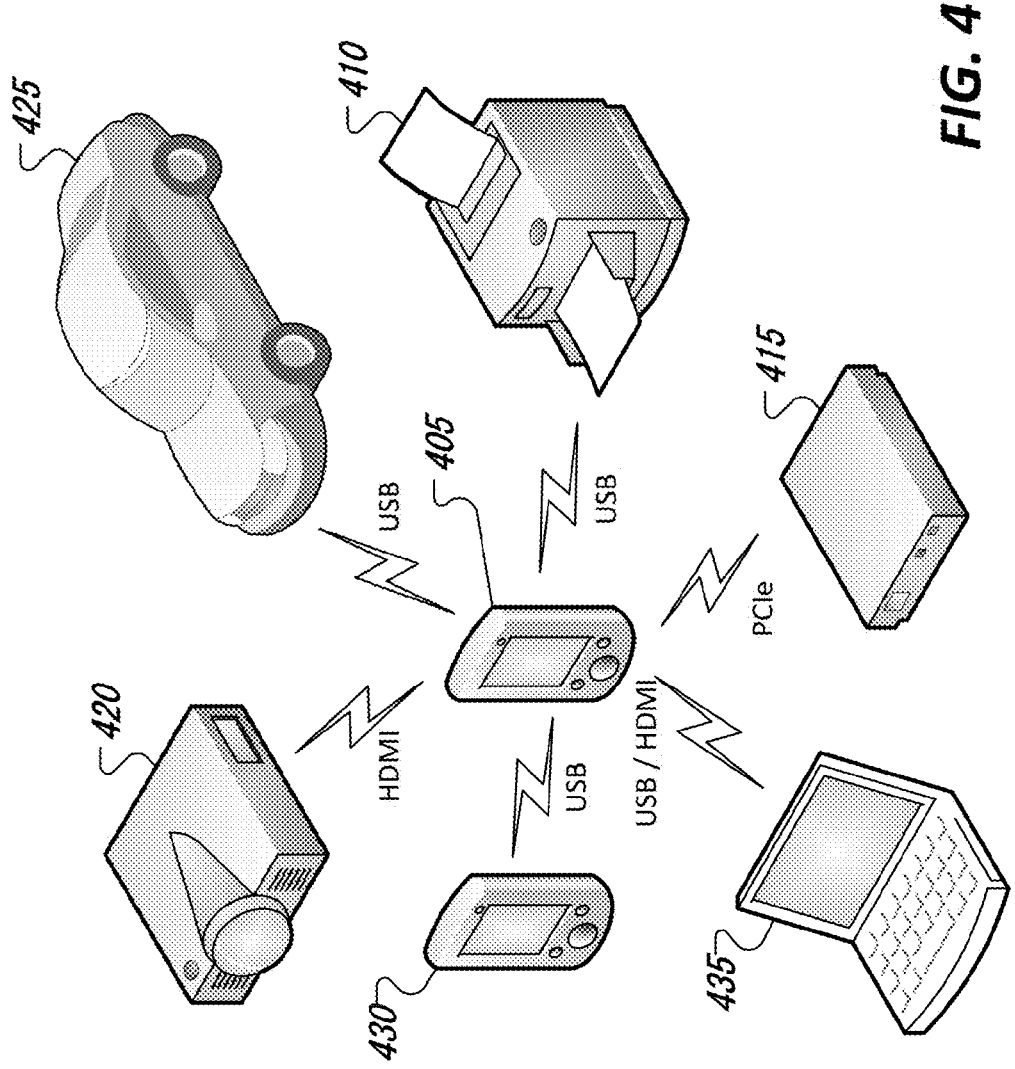
FIG. 4 illustrates an example computing device utilizing close proximity wireless communications technology.

Turning to FIG. 4, a simplified block diagram 400 is presented showing an example endpoint computing device 405, such as a smartphone or other mobile computing device, that possesses a close proximity communication module that can facilitate the negotiation and configuration of multiple different modes and protocols for use in communications with multiple different computing devices (e.g., 410, 415, 420, 425, 430, 435). For instance, a close proximity wireless connection can be established with one of a variety of different traditional personal computing peripherals, such as a printer 410, external memory device 415, and display device 420, among other examples. Different protocols can be utilized in some of the device's 405 connections with the other devices (e.g., 410, 415, 420, 425, 430, 435). The device 405 can further utilize its close proximity communication module to connect with less conventional computing devices, such as the on-board computing system of an automobile (e.g., 425), a smart household or industrial appliance, a home automation system, among other examples. Further, device 405 can communicate with other personal computing devices and hosts (e.g., 430, 435), such as other smartphones, tablets, laptops, desktops, set top boxes, gaming systems, and the like. The other devices (e.g., 410, 415, 420, 425, 430, 435) communicate with computing device 405 with their own respective close proximity communication module. Indeed, one or more of these other computing devices (e.g., 430) may be equipped to pair and communicate over their own close proximity wireless communication channels with other devices (e.g., 410, 415, 420, 425, 435).

In one implementation, a protocol can be provided to facilitate the negotiation of modes and roles within a communication session between two devices (e.g., 405 and any one of 410, 415, 420, 425, 430, 435). In some instances, the device 405 can act as a host while the other device it connects to (e.g., printer 410) assumes the role of an accessory or hub (e.g., a USB "device"). In other instances, the devices communicating over a close proximity wireless channel can both assume the host role, among other examples.

In still other examples, a device can communicate with another device using an adapter device. The adapter device can include a close proximity communication module to communicate with the device 405 and a wireline connector to connect to a legacy port of another device. The device 405 can thereby utilize its close proximity communication module to connect with another device that uses the adapter device, the adapter device serving as the wireless connection point between the other device and device 405, among other examples.

Figure 5:
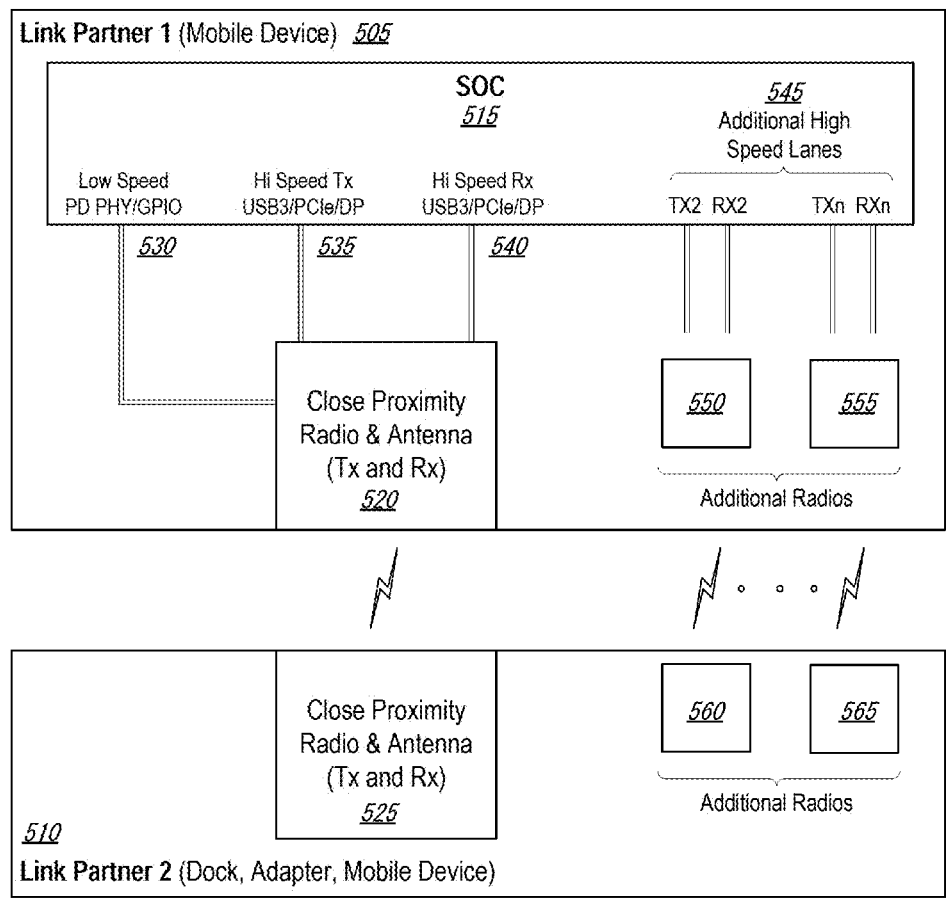
FIG. 5 illustrates a representation of two computing devices utilizing close proximity wireless communications solution.

Turning to FIG. 5, a block diagram 500 is shown illustrating an example implementation of a first link partner 505 (e.g., computing device 405) and another link partner 510 (e.g., one of devices 410, 415, 420, 425, 430, 435). Link partner 505 can include and integrate a system on chip (SoC) 515 and a close proximity communication module 520, which can include a close proximity wireless radio and antennae for sending and receiving wireless signals over a close proximity wireless channel. The SoC 515 can integrate the components that support the various low and high speed I/O components of the first link partner 505 that will use the close proximity channel as the medium of transport. An SoC can be implemented as a monolithic single chip SoC or multiple chips, among other examples.

Logic can be included in one or more of the components of the link partner 505 and/or close proximity wireless communication module 520 to facilitate establishment of close proximity wireless communications with other link partners (e.g., 510). Other link partners 510 can likewise include a close proximity communications module 525 and corresponding logic. Such logic can be implemented in hardware and/or software to support dynamic discovery of capabilities of link partners at association time and negotiate a corresponding protocol for use over the connection. By dynamically discovering the capabilities of the link partner, the connection logic can properly assume the appropriate host/device role of the link partner, determine whether to adopt an alternate protocol (or protocols) for use in communicating with the link partner, and therewith establish appropriate communications. Further, the logic can support a close proximity communications framework that can prevent the need for hardcoding the close proximity communication for a single communication protocol use case and significantly improve interoperability across a wide variety of usages.

A close proximity communications module (e.g., 520, 525) can implement the medium for the link and include functionality for both high speed and low speed data transport over the close proximity wireless link. A close proximity radio can convert low speed signals (e.g., from a low speed port 530) into wireless signals over the link and can likewise convert incoming low frequency wireless signals into signals for consumption by the SOC (and other components integrated using the SOC 515. The close proximity radio can likewise convert signals from a high speed transmission port (e.g., 535) for wireless transmission and receive high speed wireless signals for high speed receiver port 540.

In one example, close proximity communications module 520 can be provided specifically for ports 530, 535, 540. Additionally, close proximity communications module 520 can be configured to perform the initiation and configuration of a close proximity communication link that is to support data that is to be transmitted and/or received using numerous high speed lanes 545 of the link. Once the wireless link is established, additional close proximity radios (i.e., radios and antennae) (e.g., 550, 555) can be invoked and utilized to communicate data over the close proximity wireless link. Accordingly, the link partner 510 can likewise include multiple close proximity radios (e.g., 560, 565) to communicate with the additional radios (e.g., 550, 555) of its partner.

Figure 6:
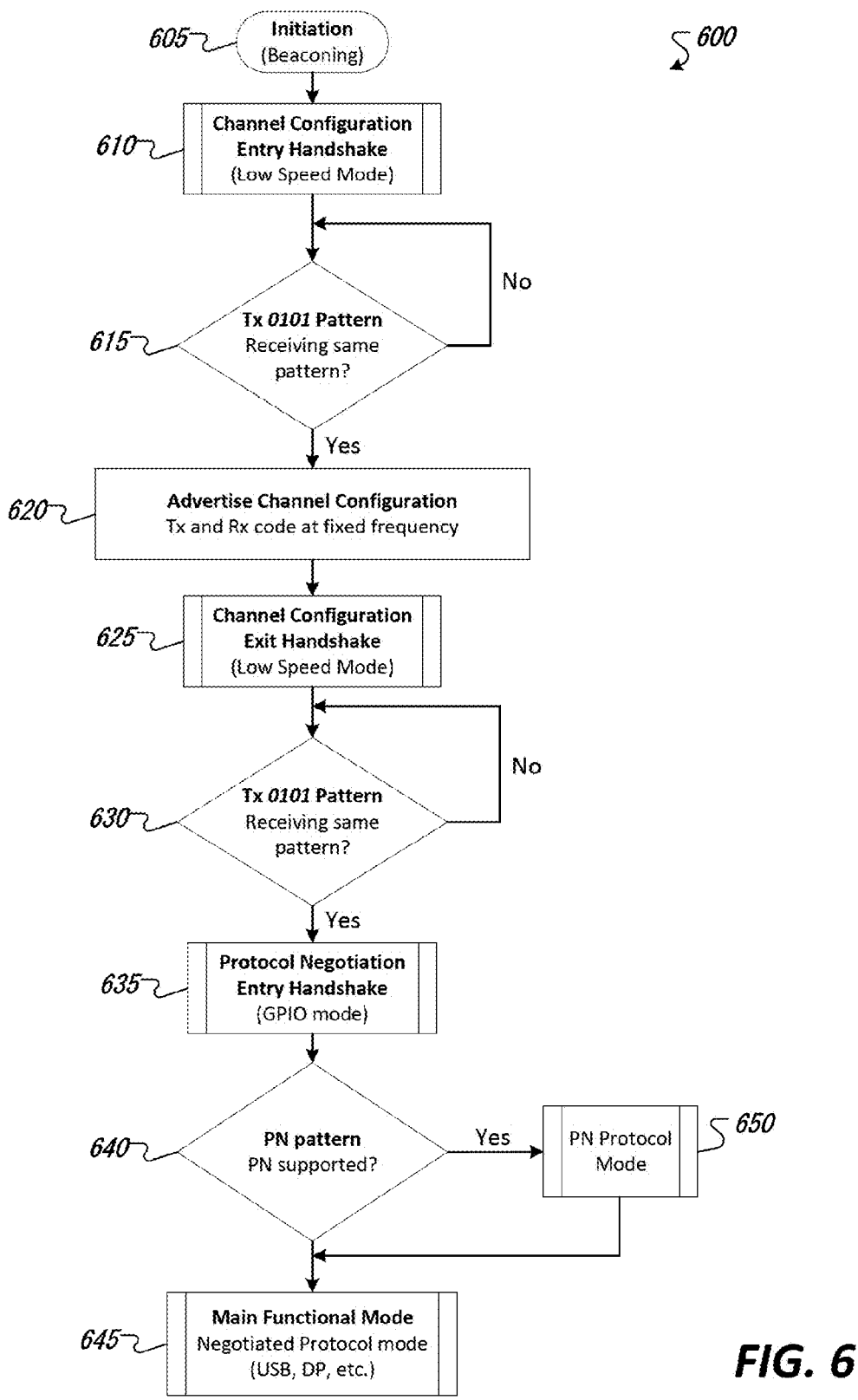
FIG. 6 illustrates a flowchart illustrating configuration of a close proximity wireless communication channel.

Turning to FIG. 6, a flowchart 600 is shown representing example techniques in the establishment and use of a close proximity wireless communication link. For example, an initiation step 605 can begin the negotiation of a close proximity wireless link. In some implementations, initiation 605 can include a device identifying the presence of a link partner using a beaconing protocol. The beaconing protocol can be configured for use in detecting that the link device is within close proximity to another device (i.e., a potential link partner) that also supports the close proximity protocol. Indeed, the beaconing protocol can be proprietary to the close proximity transport. In some instances, a link partner can be brought into close proximity with a device by bringing the link partner within a few centimeters of the device. In other instances, suitable proximity may not be detected until the device is brought into at least partial physical contact with the link partner, among other examples.

After both link partner devices detect the presence and the compatibility of the other through one or more initiation steps 605, the devices can perform a channel configuration entry handshake 610. The channel configuration entry handshake 610 can be completed to indicate entry into a channel configuration mode. In one example, the handshake can include the transmission of a pre-defined low-speed data sequence (e.g., "0101") over the close-proximity link. The link partner can also transmit the data sequence, with each device monitoring (e.g., 615) for the receipt of the sequence from its link partner following initiation 605 before proceeding (e.g., to 620). In some implementations, the sequence can be received and transmitted over a low speed I/O interface (e.g., a general-purpose input/output (GPIO) interface) between the radio and the SoC of the device. Further, in some implementations, more complex data sequences can be transported to allow some degree of channel conditioning and link adaptation to be facilitated and negotiated between the two link partners in addition to coordinating the link partners' entry into a channel configuration mode or state (e.g., at 620). For instance, the data sequence can include or be structured with qualities similar to an electrical ordered set, a series of training sequences, or another data sequence with qualities to enable performance of various adaptation tasks such as synchronization or deskew of the link partners, among other examples.

While in a channel configuration state, each link partner can transmit its respective channel configuration preference or mode to its link partner. For instance, following the handshake 610, each link partner can send a signal with a repeating pre-defined encoding that indicates a mode the corresponding device intends to assume in the communication. These signals can be sent and received, in some instances, as a low speed signal over a low speed interface. As an example, Table 1 includes example encoding values that may be used during a configuration 620 in one simplified implementation. It should be appreciated that these are presented only to illustrate a potential example implementation and that alternative encodings can also be utilized without departing from the subject matter described herein. For instance, longer encodings can be defined to support more modes. Indeed, encoding values can be defined that allow the set of supported modes to be expanded as new modes are defined or added, among other considerations.

TABLE 1

| Encoding | Description |
|---|---|
| 0000b | No operation. Used to indicate cases when a link partner is not yet ready to communicate. |
| 0001b | Link partner is an upstream facing device |
| 01xxb | Link partner is a downstream facing host device. Least significant bits can be used to indicate device sub-type and/or features (e.g., the charging capability of the device, etc.) (Note: "0101" should not be used) |
| 1xxxb | Link partner is an accessory adapter. Least significant bits used to indicate adapter type. ("1010 not used") |

As the example of Table 1 illustrates, modes can correspond to the type of link partner. In some cases, a device can support multiple modes and the mode that is advertised can reflect the current use of the device. For instance, a user can select to use the device in a particular mode. In other instances, the mode can be set automatically based on a detected context of the device. The context can relate to an application that is used by the device, can be discovered from data describing a condition of the device, among other examples. Further, the mode can be dependent on the mode advertised by its link partner. For instance, in some implementations, a link partner can determine that a particular one of its multiple supported modes is to be advertised to its link partner based on and in response to a complimentary mode advertised by its link partner.

Upon receiving and properly interpreting the advertised mode of its link partner, a device can indicate that the advertised signal was successfully received by sending a configuration state exit signal (e.g., at 625). The exit signal can be sent as a party of an exit handshake 625. For instance, the exit handshake can be completed to indicate an exit from the channel configuration state. In one example implementation, a low frequency exit handshake signal (e.g., "1010") can be transmitted until the same sequence is received from the link partner over the close proximity wireless channel. The sequence can be received and transmitted, in some instances, using a GPIO interface between the radio and the SoC of the device. The devices can exit the channel configuration mode when each has received and identified the handshake signal (e.g., at 630) from the other device.

In some implementations, identification of the operating mode of a device's link partner can allow the device to identify how to communicate and interoperate with the device over the close proximity wireless channel. This can include the selection of a particular protocol or the enablement of sub-features of the protocol based on the mode of the link partner. For instance, both devices may only support a single protocol, but only a subset of the complete set of the protocol's features may be supported by at least one of the devices (e.g., for USB, features might include role (e.g., host-only/device-only/dual-role) and speed (e.g., high speed, super speed, 3.1), among other examples). The device's link partner can make a similar determination as to the protocols and/or protocol features it supports. In some cases, the combination of roles or modes advertised by the two link partners can be mapped to a particular communication protocol or methodology to employ on the link. For instance, a first link partner may advertise a first mode and the second link partner may advertise a second mode. As each of the first and second link partners understand their own modes and receive the mode of the other link partner, each is equipped with an understanding of the pair of modes involved in the session. Based on this combination, or pairing, of modes, the devices can each identify the same appropriate communication protocol (and/or protocol features) to employ. The devices can then proceed into the main functional mode (e.g., 645) to begin communication over the link in accordance with the identified protocol.

In other implementations, configuration of the link can take place in stages. For instance, in addition to a channel configuration stage (e.g., 620), two link partners can attempt to make use of additional stages (e.g., 650) to continue negotiation of the link's configuration to configure the link at a more fine-grained level and enable alternative protocols, protocol features and modes (or sub-protocols or sub-modes of the modes and protocols identified during an early configuration stage (e.g., 620)). As an example, a protocol negotiation mode can be provided that is supported by at least some link partners. Backward compatibility can be preserved for devices that do not support this more fine-grained negotiation by first ascertaining whether the link partners each support the protocol negotiation mode (e.g., at 640). For instance, upon exit from a channel configuration stage 625, each link partner can advertise through an encoded signal whether it supports an additional protocol negotiation stage. The protocol negotiation stage may involve the sending of signals and messages that comply with a particular communication protocol and the ability of either device to participate in the protocol negotiation stage can be dependent on the device's ability to support the particular protocol. In one example, the link partners can advertise their support of the protocol negotiation stage (e.g., 650) through a handshake. For instance, a first signal can indicate that the protocol negotiation stage is supported by the sending device, while a second signal indicates that the protocol negotiation is not supported. Table 2 illustrates one example implementation of protocol negotiation stage handshake signaling, although other implementations can adopt alternative signaling values and handshaking protocols, among other examples. In one example, if any one of the two link partners advertises that they do not support the protocol negotiation mode (e.g., at 640), both link partners can finalize the link configuration based solely the results of the previous link configuration stage(s) (e.g., 620). However, if both devices implement the protocol negotiation stage 650, the devices can enter the protocol negotiation stage based on the handshake (e.g., at 635, 640).

TABLE 2

| Encoding | Description |
| --- | --- |
| 0000b | Functional discovery mode supported |
| 1111b | Functional discovery mode not supported |

In some implementations, the protocol negotiation stage 650 can involve the sending of packetized data and/or messages with more sophisticated encodings. Further, in some instances, higher speed data transmissions can be utilized to send the protocol negotiation stage messages between the devices (although low speed signaling can alternatively be employed). In one example, the modes of the devices, as advertised in a previous link configuration phase (e.g., 620) can be utilized to inform each device what communication protocols and protocol features might be appropriate to use in the communications between the devices. For instance, each device can identify one or more of its support protocols and advertise a preferred one of the supported protocols in a protocol negotiation message. In some examples, one of the link partners can assume the role of master in the protocol negotiation. Further, a device may support multiple different communications protocols, including multiple high-speed communications protocols. Such protocols can include, for instance, PCIe, USB, Low Latency Interface (LLI), Unipro, Camera Interface Specification (CSI), Display Serial Interface (DSI), QPI, HDMI, Inter-IC Sound (I2S), DisplayPort, Thunderbolt, among others. Based on its and/or its link partner's mode, the device can select an appropriate one of the protocols and request that this protocol be adopted in communications over the close proximity wireless connection. The device can also receive messages within the protocol negotiation stage to indicate the protocols supported by the link partner and can suggest or confirm a particular protocol that is supported by both devices. In some implementations, the close proximity wireless communication can serve as a unified wireless I/O for the device, allowing the device to potentially communicate over any one of its several supported communications protocols with a wide variety of devices.

The particular protocol utilized during the protocol negotiation stage 650 can include steps and messages for ending the protocol negotiation and exiting the protocol negotiation stage 650. In some cases, additional configuration stages can be supported and can be entered into based on the results of protocol negotiation stage 650 before proceeding to the main functional mode 645 of the link. In the particular example of FIG. 6, upon exiting the protocol negotiation mode 650, the devices can enter the main functional mode and exchange substantive communications over the close proximity wireless communication channel in accordance with the protocols and configuration contract negotiated through the preceding configuration negotiation stages 620, 650. The main functional mode 645 can involve high speed signaling in accordance with the specification (or a wireless version of the specification) of the negotiated protocol. In cases where a link is to communicate multiple lanes worth of data (as in the example of FIG. 5) using all or a subset of multiple close proximity radios, one of the radios (e.g., a primary close proximity wireless communication module and radio (e.g., 520, 525)) can handle the negotiation stages and, based on the link configuration that results, can cause any number of the remaining radios (e.g., 550, 555, 560, 565) to be invoked to handle communications (e.g., with the primary radio) in the main functional mode.

In one example implementation, protocols used in one or more of the configuration stages utilized to dynamically discover link partner modes and supported protocols and configure a corresponding close proximity wireless link can build upon principles and hardware utilized to support other protocols, including non-wireless communication protocols, such as USB 3.1. As one illustrative example, at least a portion of the USB Type-C wired infrastructure can be leveraged to enable one or more of the configuration stages in a close proximity wireless channel. This can allow Type-C hardware platforms and software drivers to be re-used for close proximity wireless communications. This can also simplify the design of adapter that enable support for physical Type-C connectors, among other examples. Aspects of the Type-C platform can be re-used, such as handshake codes and sequences. For instance, voltage levels of the pins seen at the Type-C connector's Configuration Channel (CC) pin in the case of a physical attach are communicated via a digital representation using the close proximity transport (e.g., in channel configuration stage 620). Additionally, aspects of USB Power Delivery mode can be re-used to facilitate a protocol negotiation phase (in 650), among other examples. As an example, the USB PD protocol can be used to communicate further options such as high voltage charging and alternate protocol mode support, among other examples.

Figure 7:
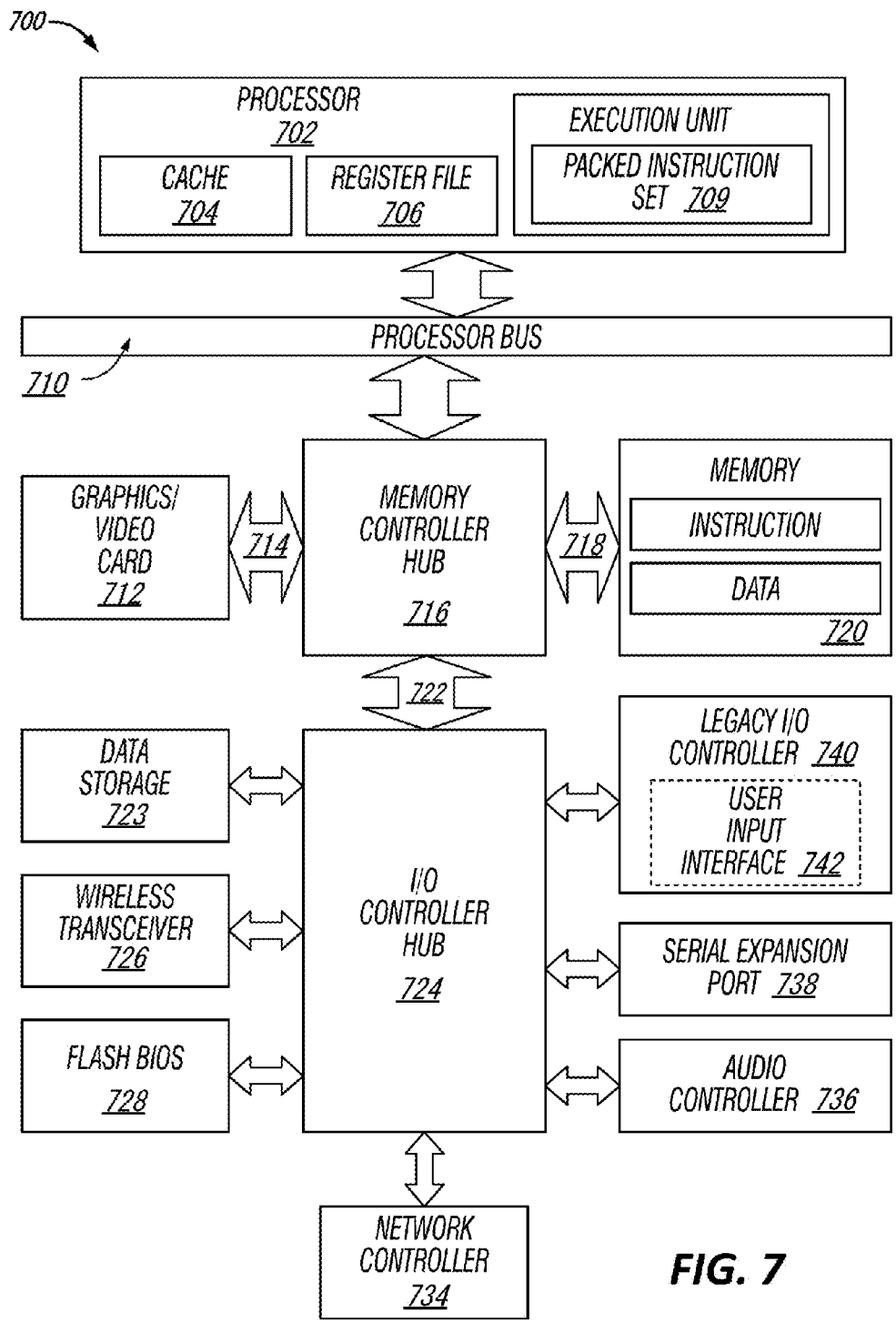
FIG. 7 illustrates an embodiment of a block diagram for a computing system.

The principles and features described herein can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, FIG. 7 illustrates a block diagram of an exemplary computer system formed with a processor that includes execution units to execute an instruction, where one or more of the interconnects implement one or more features in accordance with one embodiment of the present invention is illustrated. System 700 includes a component, such as a processor 702 to employ execution units including logic to perform algorithms for process data, in accordance with the present invention, such as in the embodiment described herein. System 700 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 700 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 702 includes one or more execution units 708 to implement an algorithm that is to perform at least one instruction. One embodiment may be described in the context of a single processor desktop or server system, but alternative embodiments may be included in a multiprocessor system. System 700 is an example of a 'hub' system architecture. The computer system 700 includes a processor 702 to process data signals. The processor 702, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that transmits data signals between the processor 702 and other components in the system 700. The elements of system 700 (e.g. graphics accelerator 712, memory controller hub 716, memory 720, I/O controller hub 724, wireless transceiver 726, Flash BIOS 728, Network controller 734, Audio controller 736, Serial expansion port 738, I/O controller 740, etc.) perform their conventional functions that are well known to those familiar with the art.

In one embodiment, the processor 702 includes a Level 1 (L1) internal cache memory 704. Depending on the architecture, the processor 702 may have a single internal cache or multiple levels of internal caches. Other embodiments include a combination of both internal and external caches depending on the particular implementation and needs. Register file 706 is to store different types of data in various registers including integer registers, floating point registers, vector registers, banked registers, shadow registers, checkpoint registers, status registers, and instruction pointer register.

Execution unit 708, including logic to perform integer and floating point operations, also resides in the processor 702. The processor 702, in one embodiment, includes a microcode (ucode) ROM to store microcode, which when executed, is to perform algorithms for certain macroinstructions or handle complex scenarios. Here, microcode is potentially updateable to handle logic bugs/fixes for processor 702. For one embodiment, execution unit 708 includes logic to handle a packed instruction set 709. By including the packed instruction set 709 in the instruction set of a general-purpose processor 702, along with associated circuitry to execute the instructions, the operations used by many multimedia applications may be performed using packed data in a general-purpose processor 702. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 708 may also be used in micro controllers, embedded processors, graphics devices, DSPs, and other types of logic circuits. System 700 includes a memory 720. Memory 720 includes a dynamic random access memory (DRAM) device, a static random access memory (SRAM) device, flash memory device, or other memory device. Memory 720 stores instructions and/or data represented by data signals that are to be executed by the processor 702.

Note that any of the aforementioned features or aspects of the invention may be utilized on one or more interconnect illustrated in FIG. 7. For example, an on-die interconnect (ODI), which is not shown, for coupling internal units of processor 702 implements one or more aspects of the invention described above. Or the invention is associated with a processor bus 710 (e.g. other known high performance computing interconnect), a high bandwidth memory path 718 to memory 720, a point-to-point link to graphics accelerator 712 (e.g. a Peripheral Component Interconnect express (PCIe) compliant fabric), a controller hub interconnect 722, an I/O or other interconnect (e.g. USB, PCI, PCIe) for coupling the other illustrated components. Some examples of such components include the audio controller 736, firmware hub (flash BIOS) 728, wireless transceiver 726, data storage 723, legacy I/O controller 710 containing user input and keyboard interfaces 742, a serial expansion port 738 such as Universal Serial Bus (USB), and a network controller 734. The data storage device 723 can comprise a hard disk drive, a floppy disk drive, a CD-ROM device, a flash memory device, or other mass storage device.

Figure 8:
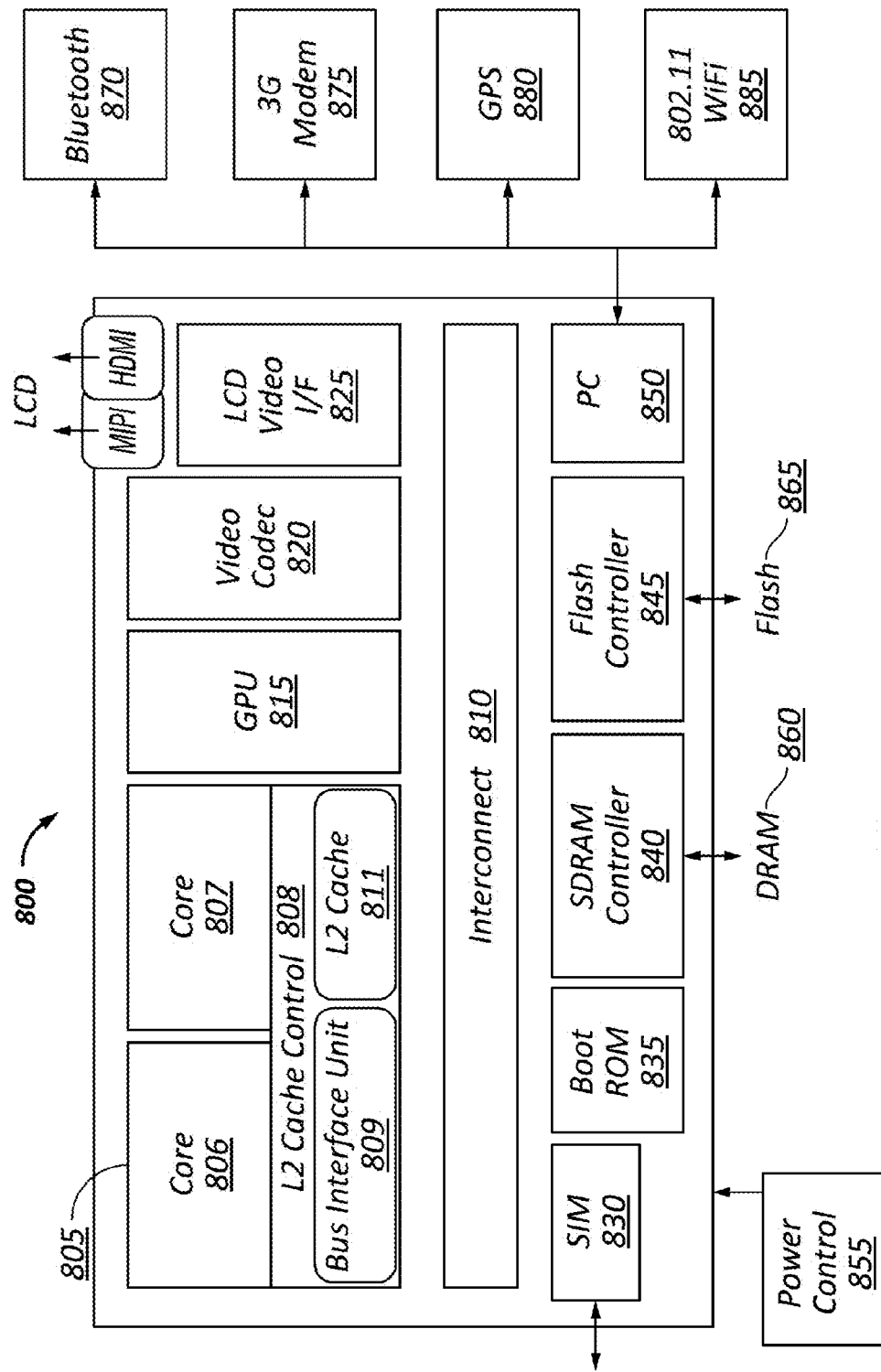
FIG. 8 illustrates another embodiment of a block diagram for a computing system including a system on chip.

Turning next to FIG. 8, an embodiment of a system on-chip (SOC) design in accordance with the inventions is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 811 to communicate with other parts of system 800. Interconnect 810 includes an on-chip interconnect, such as an IOSF, AMBA, or other interconnect discussed above, which potentially implements one or more aspects of described herein.

Interconnect 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the invention described herein.

In addition, the system illustrates peripherals for communication, such as a Bluetooth module 870, 3G modem 875, GPS 885, and WiFi 885. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide a method, an apparatus, a system, a machine readable storage, a machine readable medium, hardware- and/or software-based logic (e.g., a lane monitor), where a close proximity communication module initiates a close proximity wireless connection between a first device and a second device, and a channel configuration module sends first data over the wireless connection to advertise one or more supported channel configurations of the first device to the second device, and receives second data over the wireless connection. The second data is to advertise one or more supported channel configurations of the second device to the first device. A mode selector is provided to determine that a particular one of a plurality of modes of the first device is to be used in communications with the second device over the close proximity wireless connection based on the first and second data.

In at least one example, a protocol selector is provided to determine that a particular one of a plurality of communication protocols is to be used in communications with the second device.

In at least one example, the protocol selector is to receive a signal from the second device, and determine from the signal whether the second device supports a protocol negotiation stage, wherein a negotiation protocol is to be used in the protocol negotiation stage.

In at least one example, a determination that the second device supports the protocol negotiation stage is to cause the first and second device to enter the protocol negotiation stage, and the first and second devices are to communicate messages according to the negotiation protocol in the protocol negotiation stage to determine that the particular protocol is to be used in the communications.

In at least one example, a determination that the second device does not support the protocol negotiation stage causes a protocol to be determined for use in the communications based at least in part on the particular mode.

In at least one example, the negotiation protocol comprises a protocol based on a Universal Serial Bus (USB) Power Delivery (PD) protocol.

In at least one example, the first device supports the use of any one of the plurality of communication protocols in communications over a close proximity wireless channel.

In at least one example, the plurality of modes comprise a host mode, a device mode, and an adapter mode.

In at least one example, a transmitter is provided to send particular data over the close proximity wireless channel to the second device according to the particular mode.

In at least one example, the particular data is to be sent further based on a mode determined for the second device from the second data.

In at least one example, the transmitter is to use a plurality of close proximity radios to send the particular data, and the plurality of close proximity radios correspond to a link width of a physical channel of the first device.

In at least one example, the first and second data are to be sent in a channel configuration stage, and the first and second devices are to enter and exit the channel configuration using a corresponding handshake.

One or more embodiments may provide a method, an apparatus, a system, a machine readable storage, a machine readable medium, hardware- and/or software-based logic (e.g., a lane monitor), where a close proximity communication module is provided that includes a wireless transmitter and wireless receiver to communicate with another device over a close proximity wireless connection. A protocol configuration module can be provided to send first data over the wireless connection to advertise one or more supported interconnect protocols supported by a particular device, receive second data over the wireless connection, where the second data is to advertise one or more interconnect protocols supported by the other device to the particular device, and select at least a particular one of the interconnect protocols supported by both the particular device and the other device for use in communications between the particular device and the other device over the close proximity wireless connection.

In at least one example, the plurality of interconnect protocols comprise HDMI, USB, and PCIe.

In at least one example, the first and second data each comprise one or more messages sent over the close proximity wireless connection according to a protocol negotiation protocol.

In at least one example, the protocol configuration module is to determine whether the other device supports the protocol negotiation protocol from a signal received from the protocol negotiation protocol.

One or more embodiments may provide an apparatus, a system, a machine readable storage, a machine readable medium, hardware- and/or software-based logic, and a method to initiate a close proximity wireless connection between a first device and a second device, enter a first channel configuration stage, send first data over the close proximity wireless connection within the first channel configuration stage to advertise one or more supported modes of the first device to the second device, receive second data over the close proximity wireless connection within the first channel configuration stage, wherein the second data is to advertise one or more supported modes of the second device to the first device, and enter a second channel configuration stage to determine that a particular one of a plurality of protocols is to be used in communications with the second device over the close proximity wireless connection.

One or more embodiments may provide an apparatus and system that includes a first device comprising a first close proximity communication module, where the first device supports a first subset of a plurality of modes and a first subset of a plurality of communication protocols, and a second device including a second close proximity communication module, where the second device supports a second subset of a plurality of modes and a second subset of a plurality of communication protocols. The first and second devices are to negotiate over a close proximity wireless connection facilitated by the first and second close proximity communication modules to determine: which of the first subset of modes is to be used by the first device in subsequent communication over the close proximity wireless connection with the second device, which of the second subset of modes is to be used by the second device in the subsequent communication, and a particular one of the plurality of communication protocols to be used in the subsequent communication.

In at least one example, each of the first and second devices support a high speed close proximity wireless connection and at least some of the plurality of communication protocols comprise high speed communication protocols.

In at least one example, the first device comprises a host device and the second device comprises one of: a host device, a peripheral device, and an adapter device.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a close proximity communication module to initiate a close proximity wireless connection between a first device and a second device;
   a channel configuration module to:
     send first data over the wireless connection to advertise one or more supported channel configurations of the first device to the second device; and
     receive second data over the wireless connection, wherein the second data is to advertise one or more supported channel configurations of the second device to the first device;
   a mode selector to determine that a particular one of a plurality of modes of the first device is to be used in communications with the second device over the close proximity wireless connection based on the first and second data; and
   a protocol selector to:
     negotiate use of a particular one of a plurality of interconnect protocols supported by the first device in close proximity wireless communications between the first device and the second device, wherein the particular interconnect protocol is adapted for wired connections and negotiation of the particular communication protocol comprises signaling between the first device and the second device according to another one of the plurality of communication protocols.

2. The apparatus of claim 1, further comprising a protocol selector to determine that a particular one of a plurality of communication protocols is to be used in communications with the second device based on the negotiation.

3. The apparatus of claim 2, wherein the negotiation comprises:
   receiving a signal from the second device; and
   determining from the signal whether the second device supports a protocol negotiation stage, wherein a negotiation protocol is to be used in the protocol negotiation stage and the other protocol comprises the negotiation protocol.

4. The apparatus of claim 3, wherein a determination that the second device supports the protocol negotiation stage is to cause the first and second device to enter the protocol negotiation stage, and the first and second devices are to communicate messages according to the negotiation protocol in the protocol negotiation stage to determine that the particular protocol is to be used in the communications.

5. The apparatus of claim 3, wherein a determination that the second device does not support the protocol negotiation stage causes a protocol to be determined for use in the communications based at least in part on the particular mode.

6. The apparatus of 1, wherein the other protocol comprises a protocol based on a Universal Serial Bus (USB) Power Delivery (PD) protocol.

7. The apparatus of claim 1, wherein the plurality of modes comprise a host mode, a device mode, and an adapter mode.

8. The apparatus of claim 1, further comprising a transmitter to send particular data over the close proximity wireless channel to the second device according to the particular mode.

9. The apparatus of claim 8, wherein the particular data is to be sent further based on a mode determined for the second device from the second data.

10. The apparatus of claim 8, wherein the transmitter is to use a plurality of close proximity radios to send the particular data, and the plurality of close proximity radios correspond to a link width of a physical channel of the first device.

11. The apparatus of claim 1, wherein the first and second data are to be sent in a channel configuration stage, and the first and second devices are to enter and exit the channel configuration using a corresponding handshake.

12. An apparatus comprising:
a close proximity communication module comprising a wireless transmitter and wireless receiver to communicate with another device over a close proximity wireless connection;
a protocol configuration module to:
send first data over the wireless connection to advertise one or more supported interconnect protocols supported by a particular device in close proximity wireless communications with other devices, wherein at least some of the supported interconnect protocols comprise protocols adapted for wired connections;
receive second data over the wireless connection, wherein the second data is to advertise one or more interconnect protocols supported by the other device to the particular device;
select at least a particular one of the interconnect protocols supported by both the particular device and the other device to be applied in communications between the particular device and the other device over the close proximity wireless connection, wherein the first and second data are sent using another one of the interconnect protocols supported by both the particular device and the other device.

13. The apparatus of claim 12, wherein the plurality of interconnect protocols comprise High-Definition Multimedia Interface (HDMI), Universal Serial Bus (USB), and Peripheral Component Interconnect Express (PCIe).

14. The apparatus of claim 12, wherein the other interconnect protocol comprises a protocol negotiation protocol and the first and second data each comprise one or more messages sent over the close proximity wireless connection according to the protocol negotiation protocol.

15. The apparatus of claim 14, wherein the protocol configuration module is to determine whether the other device supports the protocol negotiation protocol from a signal received from the protocol negotiation protocol.

16. A non-transitory computer readable medium comprising code that, when executed, is to cause a computing device to:
initiate a close proximity wireless connection between a first device and a second device;
enter a first channel configuration stage;
send first data over the close proximity wireless connection within the first channel configuration stage to advertise one or more supported modes of the first device to the second device;
receive second data over the close proximity wireless connection within the first channel configuration stage, wherein the second data is to advertise one or more supported modes of the second device to the first device; and
enter a second channel configuration stage to cause a negotiation between the first and second devices to determine that a particular one of a plurality of protocols supported by the first device is to be used in communications with the second device over the close proximity wireless connection, wherein the particular protocol comprises a protocol defined for use in wired connections.

17. A system comprising:
a first device comprising a first close proximity communication module, wherein the first device supports a first subset of a plurality of modes and a first subset of a plurality of communication protocols;
a second device comprising a second close proximity communication module, wherein the second device supports a second subset of a plurality of modes and a second subset of the plurality of communication protocols, wherein at least some of the plurality of interconnect protocols comprise protocols adapted for wired connections;
wherein the first and second devices are to negotiate over a close proximity wireless connection facilitated by the first and second close proximity communication modules to determine:
which of the first subset of modes is to be used by the first device in subsequent communication over the close proximity wireless connection with the second device,
which of the second subset of modes is to be used by the second device in the subsequent communication, and
a particular one of the plurality of communication protocols to be used in the subsequent communication.

18. The system of claim 17, wherein each of the first and second devices support a high speed close proximity wireless connection and at least some of the plurality of communication protocols comprise high speed communication protocols.

19. The system of claim 17, wherein the first device comprises a host device and the second device comprises one of: a host device, a peripheral device, and an adapter device.

* * * * *

UNITED STATES PATENT AND TRADEMARK OFFICE
CERTIFICATE OF CORRECTION

PATENT NO. : 9,723,431 B2
APPLICATION NO. : 14/576170
DATED : August 1, 2017
INVENTOR(S) : Sridharan Ranganathan et al.

It is certified that error appears in the above-identified patent and that said Letters Patent is hereby corrected as shown below:

In the Claims

In Column 22, Line 62, in Claim 6, after "of" insert -- claim --.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*